United States Patent
Tan et al.

(10) Patent No.: US 12,055,448 B1
(45) Date of Patent: Aug. 6, 2024

(54) VIBRATING WIRE STRESS GAUGE AND STRESS TESTING EQUIPMENT SUITABLE FOR USE IN LOW TEMPERATURE ENVIRONMENTS

(71) Applicant: Institute of Rock and Soil Mechanics, Chinese Academy of Sciences, Wuhan (CN)

(72) Inventors: Xianjun Tan, Wuhan (CN); Weizhong Chen, Wuhan (CN); Hongdan Yu, Wuhan (CN); Jingqiang Yuan, Wuhan (CN); Yun Zhou, Wuhan (CN); Xuyan Tan, Wuhan (CN); Peichao Zheng, Wuhan (CN)

(73) Assignee: Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 0 days.

(21) Appl. No.: 18/646,672

(22) Filed: Apr. 25, 2024

(30) Foreign Application Priority Data

May 15, 2023 (CN) ......................... 202310553350.X

(51) Int. Cl.
*G01L 1/10* (2006.01)
(52) U.S. Cl.
CPC ..................... *G01L 1/106* (2013.01)
(58) Field of Classification Search
CPC ............ G01L 1/106; G01L 1/10; G01L 1/103
See application file for complete search history.

(56) References Cited

U.S. PATENT DOCUMENTS

| | | | | |
|---|---|---|---|---|
| 3,675,474 A | * | 7/1972 | Browne | G01M 5/0066 73/768 |
| 4,277,973 A | * | 7/1981 | Hawkes | G01L 9/0013 73/DIG. 1 |
| 2021/0156107 A1 | * | 5/2021 | Zhang | G01H 9/004 |

FOREIGN PATENT DOCUMENTS

| | | |
|---|---|---|
| CN | 101776431 A | 7/2010 |
| CN | 218724899 U | 3/2023 |
| CN | 219015522 U | 5/2023 |

* cited by examiner

*Primary Examiner* — Paul M. West
(74) *Attorney, Agent, or Firm* — Nitin Kaushik

(57) ABSTRACT

The disclosure provides a vibrating wire compressive stress gauge and stress testing equipment suitable for use in low-temperature environments. By providing a stress trigger sleeve made of elastic material, the concrete structure of the lining itself expands when it is affected by high or low temperatures, extruding the stress trigger sleeve, and the extrusion force is offset through the elastic force of the elastic material, thereby preventing the expansion force from being transmitted to the vibrating wire assembly to generate stress signals that are caused by the self-expansion of the lining structure, which may cause measurement error. Specifically, the vibrating wire assembly is provided in the vibrating wire measurement space composed of a stress trigger sleeve and a pair of anchoring disks. When the lining is subjected to external stress, a certain internal force will be generated.

7 Claims, 1 Drawing Sheet

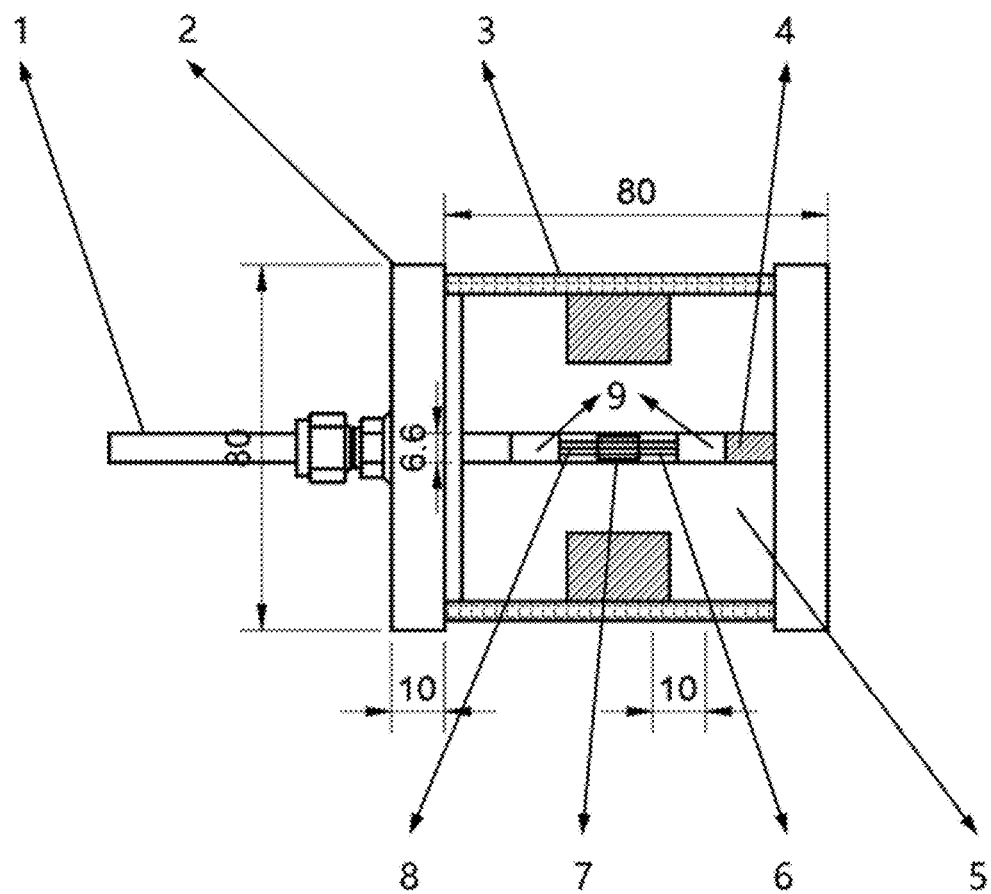

VIBRATING WIRE STRESS GAUGE AND STRESS TESTING EQUIPMENT SUITABLE FOR USE IN LOW TEMPERATURE ENVIRONMENTS

CROSS-REFERENCE TO RELATED APPLICATIONS

The application claims priority to Chinese patent application No. 202310553350X, filed on May 15, 2023, the entire contents of which are incorporated herein by reference.

TECHNICAL FIELD

The disclosure belongs to the technical field of construction, and particularly relates to a vibrating wire stress gauge and stress testing equipment suitable for use in low temperature environments.

BACKGROUND

The earth pressure gauge is an engineering pressure tool that measures the internal earth pressure of rock and soil. It is suitable for measuring the compressive stress of earth-rock dams, bridges and tunnels, retaining walls, subways and other structures. It is also used to measure the frost heave force in glacial frozen soil. Earth pressure gauges can generally be divided into vibrating wire type, strain gauge type, fiber grating type, etc. Wherein, the vibrating wire type earth pressure gauge has a simple structure, low manufacturing cost, and good stability in complex environments, so it has been widely used. In tunnel engineering, after the secondary lining is applied, the surrounding rock will still deform, resulting in a certain internal force in the lining. When the internal force of the lining concrete is too large, the lining will crack or even be completely destroyed. Therefore, it is important to measure the internal forces of tunnel lining concrete. The vibrating wire earth pressure gauge is embedded in the lining. When the lining generates internal force or the internal force changes, the pressure-bearing plate will simultaneously sense the change in stress and deform. The deformation will be transmitted to the vibration detection assembly through which the vibration frequency is detected, thus obtaining the internal force generated by the lining; however, in the prior art, the stress is transmitted through a rigid pressure-bearing plate, which causes a large error between the measured stress and the actual stress change. When the concrete undergoes thermal expansion and shrinkage, the pressure-bearing plate will be greatly affected, and the accuracy of the measurement will be greatly reduced. Moreover, when this type of pressure gauge is used in cold and low-temperature environments, due to the influence of low temperature, the sensitivity of the stainless steel plate will also be reduced, and it will not be able to truly reflect the stress changes of the concrete.

It can be seen that how to provide a vibrating wire stress gauge that can accurately measure lining stress in a low temperature environment is an urgent technical problem that needs to be solved by those skilled in the art.

SUMMARY

The disclosure provides a vibrating wire stress gauge and stress testing equipment suitable for use in low-temperature environments to at least solve the above technical problems.

In order to solve the above problems, a first aspect of the disclosure provides a vibrating wire stress gauge suitable for use in low temperature environments. The stress gauge is used to measure the stress applied to the structural layers of concrete, including: a stress trigger sleeve that is arranged in the concrete structural layer, and the two ends of the stress trigger sleeve are open; a pair of anchoring disks that are correspondingly arranged at the two end openings of the stress trigger sleeve, and forms a sealed vibrating wire measurement space with the stress trigger sleeve; a vibrating wire assembly that is arranged inside the vibrating wire measurement space for generating an electric signal indicating a vibration frequency after passively bearing an external stress; a rigid assembly that fills the vibrating wire measurement space and forms an integrated structure therewith; a transmission part, one end of which passes through one of the anchoring disks to the interior of the rigid assembly and is connected to the vibrating wire assembly, so as to transmit an electrical signal indicating the vibration frequency to an external display terminal through the other end of the transmission part; wherein the stress trigger sleeve is made of elastic material.

In the first aspect, the stress trigger sleeve is made of PVC material.

In the first aspect, the vibrating wire assembly includes: a steel wire in a drawn-out, filamentous form; a first steel wire indenter, the axis of one end of which is fixedly connected to one end of the steel wire, and the other end is connected to one end of the transmission part; a second steel wire indenter, the axis of one end of which is fixedly connected to the other end of the steel wire, and the other end is connected to the other anchoring disk; a metal sleeve coaxially arranged on the periphery of the steel wire, and one end of the metal sleeve is fixedly connected to one end of the first steel wire indenter, and the other end of the metal sleeve is fixedly connected to one end of the second steel wire indenter; an excitation coil coaxially arranged in the metal sleeve, and the outer side wall of the excitation coil is fixed to the inner wall of the metal sleeve. An electromagnetic cutting space is formed from the inner wall of the excitation coil to the axis position.

In the first aspect, a first sealing member is further provided between the other end of the second steel wire indenter and the other anchoring disk, and the first sealing member is made of epoxy resin.

In the first aspect, the rigid assembly is made of rigid material.

In the first aspect, a mounting hole is provided through the center of one of the anchoring disks; the stress gauge further includes: a first screw joint, including a first sleeve, one end of which is inserted into the mounting hole, the other end of which is located outside the mounting hole, and an internal thread is provided on the inner wall of the first sleeve; a second screw joint, including a second sleeve, an external thread matching the internal thread is provided on the outer side wall of one end of the second sleeve. The second screw joint is detachably connected in the first sleeve through the external thread, and the other end of the second sleeve is internally fixedly connected to one end of the transmission part.

In the first aspect, the stress gauge further includes: a rubber collar, including a first annular wall body and a second annular wall body, the cross-section of the first annular wall body and the second the first annular wall body is L-shaped, the rubber collar is snugly connected to the outer surface of the other end of the first sleeve through the first annular wall body, and the rubber collar is snugly connected to the periphery of one of the anchoring disks along the mounting hole through the second annular wall body.

In the first aspect, the transmission part is a four-core shielded cable.

In the first aspect, the stress gauge further includes: a steel wire protective cover coaxially arranged on the periphery of the steel wire, and a protective space is formed between the outer side wall of the steel wire protective cover and the outer side wall of the steel wire; wherein one end of the steel wire protective cover is connected to one end of one of the anchoring disks, and the other end of the steel wire protective cover is connected to one end of the other anchoring disk.

In the second aspect, the disclosure provides a stress testing equipment suitable for use in low-temperature environments, including the above-mentioned vibrating wire stress gauge suitable for use in low-temperature environments.

Beneficial effects: the disclosure provides a vibrating wire stress gauge suitable for use in low-temperature environments. By providing a stress trigger sleeve made of elastic material, the concrete structure of the lining itself expands when it is affected by high or low temperatures, extruding the stress trigger sleeve, and the extrusion force of offset through the elastic force of the elastic material, thereby preventing the expansion force from being transmitted to the vibrating wire assembly to generate stress signals that are caused by the self-expansion of the lining structure, which may cause measurement error. Specifically, the vibrating wire assembly is provided in the vibrating wire measurement space composed of a stress trigger sleeve and a pair of anchoring disks and a rigid assembly is filled between the vibrating wire assembly and the stress sleeve such that when the lining is subjected to external stress, a certain internal force will be generated. When the internal force exceeds the elastic force of the stress trigger sleeve, the internal force will be transmitted to the vibrating wire assembly through the rigid assembly, causing the vibrating wire assembly to generate an electrical signal indicating the vibration frequency, and which is transmitted to the external display terminal through the transmission part, so that the internal force of the lining can be monitored in real time through the external display terminal.

BRIEF DESCRIPTION OF DRAWINGS

In order to more clearly explain the embodiments of this specification or the technical solutions in the prior art, the drawings required to be used in the embodiments will be briefly described below. It will be obvious that the drawings described below are only some embodiments of the disclosure, and other drawings may be obtained from these drawings without creative effort for those of ordinary skill in the art.

The FIGURE is a structural diagram of a vibrating wire stress gauge suitable for use in low-temperature environments in the Embodiment 1 of the disclosure.

DESCRIPTION OF REFERENCE NUMERALS 1, four-core shielded cable;
2, anchoring disk;
3, stress trigger sleeve;
4, sealing member;
5, rigid assembly;
6, steel wire protective cover;
7, excitation coil;
8, steel wire;
9, steel wire indenter.

DETAILED DESCRIPTION OF THE EMBODIMENTS

The technical solutions in the disclosure will be clearly and completely described below with reference to the accompanying drawings. It will be obvious that the described embodiments are only part of and not all of the embodiments of the disclosure. Based on the embodiments in the disclosure all other embodiments obtained by those of ordinary skill in the art fall within the scope of protection of the disclosure.

Also, in the embodiments of this specification, when an assembly is referred to as being "fixed" to another assembly, it may be directly on the other assembly or there may also be an intervening assembly. When an assembly is said to be "connected" to another assembly, it may be directly connected to the other assembly or there may be an intervening assembly present at the same time. When an assembly is said to be "arranged on" another assembly, it can be directly arranged on the other assembly or there may be an intervening assembly at the same time. The terms "vertical", "horizontal", "left", "right" and similar expressions used in the embodiments of this specification are for illustrative purposes only and are not intended to limit the disclosure.

Embodiment 1

As shown in the FIGURE, the Embodiment 1 provides a vibrating wire stress gauge suitable for use in low-temperature environments. The stress gauge is used to measure the stress on the concrete structural layer. The stress gauge includes: a stress trigger sleeve 3, a pair of anchoring disk 2, a vibrating wire assembly, a rigid assembly 5 and a transmission part.

Wherein the stress trigger sleeve 3 is arranged in the concrete structural layer, and the two ends of the stress trigger sleeve 3 are open; a pair of anchoring disks that are correspondingly arranged at the two end openings of the stress trigger sleeve 3, and forms a sealed vibrating wire measurement space with the stress trigger sleeve 3; the vibrating wire assembly is arranged inside the vibrating wire measurement space for generating an electric signal indicating a vibration frequency after passively bearing an external stress; the rigid assembly 5 fills the vibrating wire measurement space and forms an integrated structure therewith; one end of the transmission part passes through one of the anchoring disks 2 to the interior of the rigid assembly 5 and is connected to the vibrating wire assembly to transmit the electrical signal indicating the vibration frequency to the external display terminal through the other end of the transmission part; wherein, the stress trigger sleeve 3 is made of elastic material.

Specifically, the Embodiment 1 of the disclosure provides a vibrating wire stress gauge suitable for use in low-temperature environments. By providing a stress trigger sleeve 3 made of elastic material, the concrete structure of the lining itself expands when it is affected by high or low temperatures, extruding the stress trigger sleeve 3, and the extrusion force is offset through the elastic force of the elastic material, thereby preventing the expansion force from being transmitted to the vibrating wire assembly to generate stress signals that are caused by the self-expansion of the lining structure, which may cause measurement error.

Specifically, the vibrating wire assembly is provided in the vibrating wire measurement space composed of a stress trigger sleeve 3 and a pair of anchoring disks 2 and a rigid assembly 5 is filled between the vibrating wire assembly and the stress sleeve such that when the lining is subjected to external stress, a certain internal force will be generated. When the internal force exceeds the elastic force of the stress trigger sleeve 3, the internal force will be transmitted to the vibrating wire assembly through the rigid assembly 5, causing the vibrating wire assembly to generate an electrical signal indicating the vibration frequency, and which is transmitted to the external display terminal through the transmission part, so that the internal force of the lining can be monitored in real time through the external display terminal.

In some possible implementations, the stress trigger sleeve 3 is made of PVC material.

This is because the PVC material has good elasticity and sealing properties. When the lining concrete itself deforms due to temperature reasons, such as shrinkage after thermal expansion and freeze-thaw cycles (Concrete contains water. When the temperature is low, the water freezes and the volume expands. When the temperature rises, the water melts and the volume shrinks), the stress caused by this deformation can be offset by the stress trigger sleeve made of PVC material, thereby preventing the expansion force from being transmitted to the vibrating wire assembly to generate stress signals that are caused by the self-expansion of the lining structure, which may cause measurement error; in this embodiment, it is preferred to set the thickness of the stress trigger sleeve 3 to 10 mm.

In some possible implementations, the vibrating wire assembly includes: a steel wire 8 in a drawn-out, filamentous form; a first steel wire indenter 9, the axis of one end of the first steel wire indenter 9 is fixedly connected to one end of the steel wire 8, and the other end is connected to one end of the transmission part; a second steel wire indenter 9, the axis of one end of the second steel wire indenter 9 is fixedly connected to the other end of the steel wire 8, and the other end is connected to the other anchoring disk 2; a metal sleeve coaxially arranged on the periphery of the steel wire 8, and one end of the metal sleeve is fixedly connected to one end of the first steel wire indenter, and the other end of the metal sleeve is fixedly connected to one end of the second steel wire indenter 9; an excitation coil 7 coaxially arranged in the metal sleeve, and the outer side wall of the excitation coil 7 is fixed to the inner wall of the metal sleeve. An electromagnetic cutting space is formed from the inner wall of the excitation coil 7 to the axis position.

This is to form a connection space through the first steel wire indenter 9 and the second steel wire indenter 9 arranged opposite to it, and then the steel wire 8 is arranged between the two so that the steel wire 8 is in a straightened state. To prevent the steel wire 8 from being directly impacted by external force and causing the steel wire 8 to break, a metal sleeve is arranged outside the steel wire 8 to protect the steel core. Meanwhile, the two ends of the metal sleeve are connected to the first steel wire indenter 9 and the second steel wire indenter 9, when the steel wire 8 vibrates, the electromotive force generated by the cutting excitation coil 7 will be transmitted through the metal sleeve. The diameter of the metal sleeve is preferably 6.6 mm.

In some possible implementations, a first sealing member 4 is arranged between the other end of the second steel wire indenter 9 and the other anchoring disk 2, and the first sealing member 4 is made of epoxy resin.

This is to prevent external water vapor or debris from entering the metal sleeve and interfering with the vibration of the steel wire 8, so that the vibration frequency of the steel wire 8 becomes dull or the steel wire 8 breaks, thereby causing measurement errors.

In some possible implementations, the rigid assembly 5 is made of rigid material.

This allows the external force to be transmitted to the vibrating wire assembly through the rigid material without error, thereby improving the accuracy of stress transmission.

In some possible implementations, a mounting hole is provided through the center of one of the anchoring disks 2; the stress gauge also includes: a first screw joint, including a first sleeve, and one end of which is inserted into the mounting hole, the other end of which is located outside the mounting hole, and the inner wall of which is provided with internal threads; a second screw joint, including a second sleeve, an external thread matching the internal thread is provided on the outer side wall of one end of the second sleeve. The second screw joint is detachably connected in the first sleeve through the external thread, and the other end of the second sleeve is internally fixedly connected to one end of the transmission part.

In order to improve the connection stability between the first anchoring disk 2 and the transmission part, a mounting hole is provided at the center of the anchoring disk 2 on the side where the transmission part is arranged, and then the first screw joint and the second screw joint are matched in a detachable connection mode to improve the connection stability. At the same time, in order to prevent external water vapor or debris from entering the inside of the vibrating wire measurement space through the connection hole, a rubber collar is provided at the location where the anchoring disk 2 and the first screw joint are arranged. The rubber collar includes a first annular wall body and a second annular wall body. The cross-sections of the first annular wall body and the second annular wall body are L-shaped. The rubber collar is snugly connected to the outer surface of the other end of the first sleeve through the first annular wall body, and the rubber collar is snugly connected to the periphery of one of the anchoring disks 2 along the mounting hole through the second annular wall body. In this way, the second annular wall of the rubber collar seals the connection hole, thereby preventing external water vapor or debris from entering the vibrating wire measurement space through the connection hole.

In some possible implementations, the transmission part is a four-core shielded cable 1.

This cable has the characteristics of fast transmission speed and can transmit the detected electrical signal quickly and without loss, thus improving the accuracy of signal transmission.

In some possible implementations, the stress gauge also includes: a steel wire protective cover 6 coaxially arranged on the periphery of the steel wire 8, and a protective space is formed between the outer side wall of the steel wire protective cover 6 and the outer side wall of the steel wire 8; wherein one end of the steel wire protective cover 6 is connected to one end of one of the anchoring disks 2, and the other end of the steel wire protective cover 6 is connected to one end of the other anchoring disk 2.

This is to further prevent external water vapor or debris from directly contacting the steel wire 8 and causing damage to it. Therefore, the steel wire 8 is protected again by the steel wire protective cover 6.

Embodiment 2

Embodiment 2 of the disclosure provides a stress testing equipment suitable for use in low-temperature environments. The testing equipment includes the above-mentioned vibrating wire stress gauge suitable for use in low-temperature environments. The stress testing equipment applies a stress trigger sleeve made of elastic material arranged in the vibrating wire stress gauge such that when the concrete structure of the lining itself is affected by high or low temperatures, it expands and extrudes the stress trigger sleeve which can offset the extrusion force through the elastic force of the elastic material, thereby preventing the expansion force from being transmitted to the vibrating wire assembly, which may generate a stress signal that is caused by the self-expansion of the lining structure, thereby causing measurement errors.

Since the Embodiment 2 and the Embodiment 1 are an embodiment under the same inventive concept, and some of their structures are exactly the same, the structures in the Embodiment 2 that are essentially the same as the Embodiment 1 will not be described in detail. For undetailed parts, please refer to the Embodiment 1.

Finally, it should be noted that the above-mentioned embodiments are only specific implementations of the disclosure and are used to illustrate the technical solutions of the disclosure, rather than to limit them. The protection scope of the disclosure is not limited thereto. Although the disclosure has been described in detail with reference to the foregoing embodiments, it should be understood by those of ordinary skill in the art that those skilled in the art can still modify or easily think of changes to the technical solutions recorded in the foregoing embodiments within the technical scope disclosed by the disclosure, or make equivalent substitutions for some of the technical features; and these modifications, changes or substitutions will not cause the essence of the corresponding technical solutions to depart from the scope of the technical solutions of the embodiments of the disclosure. All are covered by the protection scope of the disclosure. Therefore, the protection scope of the disclosure should be subject to the protection scope of the claims.

Although the embodiments of the disclosure have been disclosed above, they are not limited to the applications listed in the description and implementations. They can be applied to various fields suitable for the disclosure. Additional modifications will readily occur to those skilled in the art, and the disclosure is therefore not limited to the specific details and illustrations shown and described herein without departing from the general concept defined by the claims and equivalent scope.

What is claimed is:

1. A vibrating wire stress gauge suitable for use in low-temperature environments, wherein the stress gauge is used to measure stress applied on a concrete structural layer and comprises:
    a stress trigger sleeve arranged in the concrete structural layer, and both ends of the stress trigger sleeve are open;
    a pair of anchoring disks correspondingly arranged at openings at both ends of the stress trigger sleeve, forming a sealed vibrating wire measurement space with the stress trigger sleeve;
    a vibrating wire assembly arranged inside the vibrating wire measurement space and used to generate an electrical signal indicating a vibration frequency after passively bearing external stress;
    a rigid assembly filled in the vibrating wire measurement space and forming an integrated structure with the vibrating wire measurement space;
    a transmission part, one end of which passing through one of the anchoring disks to the interior of the rigid assembly and being connected to the vibrating wire assembly, so as to transmit the electrical signal indicating the vibration frequency to an external display terminal through the other end of the transmission part;
    wherein, the stress trigger sleeve is made of PVC material;
    the vibrating wire assembly comprises:
    a steel wire in a drawn-out, filamentous form;
    a first steel wire indenter, an axis of one end of which being fixedly connected to one end of the steel wire, and the other end being connected to one end of the transmission part;
    a second steel wire indenter, an axis of one end of which being fixedly connected to the other end of the steel wire, and the other end being connected to the other anchoring disk;
    a metal sleeve coaxially arranged on a periphery of the steel wire, and one end of the metal sleeve being fixedly connected to one end of the first steel wire indenter, and the other end of the metal sleeve being fixedly connected to one end of the second steel wire indenter; and
    an excitation coil coaxially arranged in the metal sleeve, and an outer side wall of the excitation coil being fixed to an inner wall of the metal sleeve: an electromagnetic cutting space being formed from an inner wall of the excitation coil to an axis position.

2. The vibrating wire stress gauge suitable for use in low-temperature environments according to claim 1, wherein
    a sealing member is also arranged between the other end of the second steel wire indenter and the other anchoring disk, and the sealing member is made of epoxy resin.

3. The vibrating wire stress gauge suitable for use in low-temperature environments according to claim 2, wherein
    the rigid assembly is made of beryllium copper alloy or titanium alloy.

4. The vibrating wire stress gauge suitable for use in low-temperature environments according to claim 3, wherein
    a mounting hole is provided through a center of one of the anchoring disks;
    the stress gauge further comprises:
    a first screw joint, comprising a first sleeve, one end of which being inserted into the mounting hole, and the other end of which being located outside the mounting hole, and an inner side wall of the first sleeve being provided with internal threads;
    a second screw joint, comprising a second sleeve, and an external thread matching the internal thread is provided on an outer side wall of one end of the second sleeve; the second screw joint being detachably connected in the first sleeve through the external thread, and the other end of the second sleeve being internally fixedly connected to one end of the transmission part.

5. The vibrating wire stress gauge suitable for use in low-temperature environments according to claim 4, wherein the stress gauge further comprises:
    a rubber collar, comprising a first annular wall body and a second annular wall body, a cross-section of the first annular wall body and the second annular wall body being L-shaped, the rubber collar being snugly connected to an outer surface of the other end of the first sleeve through the first annular wall body, and the rubber collar being snugly connected to a periphery of one of the anchoring disks along the mounting hole through the second annular wall body.

6. The vibrating wire stress gauge suitable for use in low-temperature environments according to claim 5, wherein
the transmission part is a four-core shielded cable.

7. The vibrating wire stress gauge suitable for use in low-temperature environments according to claim 6, wherein the stress gauge further comprises:
a steel wire protective cover coaxially arranged on a periphery of the steel wire, and a protective space is formed between an outer side wall of the steel wire protective cover and the outer side wall of the steel wire; wherein one end of the steel wire protective cover is connected to one end of one of the anchoring disks, and the other end of the steel wire protective cover is connected to one end of the other anchoring disk.

* * * * *